US011333906B2

(12) United States Patent
Ohlendorf et al.

(10) Patent No.: US 11,333,906 B2
(45) Date of Patent: May 17, 2022

(54) DETERMINATION OF AT LEAST ONE OPTICAL PARAMETER OF A SPECTACLE LENS

(71) Applicant: Carl Zeiss Vision International GmbH, Aalen (DE)

(72) Inventors: Arne Ohlendorf, Tübingen (DE); Alexander Leube, Aalen (DE); Siegfried Wahl, Donzdorf (DE); Katharina Rifai, Tübingen (DE); Yannick Sauer, Tübingen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 17/408,751

(22) Filed: Aug. 23, 2021

(65) Prior Publication Data

US 2021/0382329 A1    Dec. 9, 2021

Related U.S. Application Data

(63) Continuation of application No. PCT/EP2020/061206, filed on Apr. 22, 2020.

(30) Foreign Application Priority Data

Apr. 23, 2019  (EP) .................................... 19170551

(51) Int. Cl.
    *G02C 13/00*      (2006.01)
(52) U.S. Cl.
    CPC .................................. *G02C 13/005* (2013.01)
(58) Field of Classification Search
    CPC ............ G02C 13/005; G01M 11/0228; G01M 11/0257
    USPC ................................................ 351/200, 205
    See application file for complete search history.

(56) References Cited

U.S. PATENT DOCUMENTS

2015/0029323 A1   1/2015  Nagao
2020/0225508 A1*  7/2020  Kittenplon ............. G02C 7/027

FOREIGN PATENT DOCUMENTS

DE    102011115239 A1   3/2013
EP        2608109 A1    6/2013
(Continued)

OTHER PUBLICATIONS

International Preliminary Report on Patentability issued in PCT/EP2020/061206, to which this application claims priority, completed Mar. 24, 2021, and English-language translation thereof.
(Continued)

*Primary Examiner* — Tuyen Tra
(74) *Attorney, Agent, or Firm* — Tautz & Schuhmacher LLC; Georg Hasselmann

(57) ABSTRACT

A method, a device, and a computer program for determining at least one optical parameter of a spectacle lens, and a method for manufacturing the spectacle lens using the at least one optical parameter are disclosed. The optical parameter denotes a value for a property of the spectacle lens which is adjusted during manufacture of the spectacle lens to achieve an intended correction of ametropia of at least one eye of a user of the spectacle lens. The method includes: a) capturing at least one image of a user wearing the spectacle lens; and b) determining at least one optical parameter of the spectacle lens by image processing the at least one image, wherein the at least one image contains an eye portion including at least one eye and/or a face portion adjacent to at least one eye of a user of the spectacle lens.

17 Claims, 4 Drawing Sheets

(56) References Cited

FOREIGN PATENT DOCUMENTS

| EP | 2830001 A1 | 1/2015 |
|----|------------|--------|
| EP | 3182311 A1 | 6/2017 |
| EP | 3730036 A1 | 10/2020 |
| EP | 3730037 A1 | 10/2020 |
| EP | 3730918 A1 | 10/2020 |
| EP | 3730919 A1 | 10/2020 |
| WO | 2016181310 A1 | 11/2016 |
| WO | 2017125902 A1 | 7/2017 |
| WO | 2017134275 A1 | 8/2017 |

OTHER PUBLICATIONS

Thibos et al. "Power Vectors: An Application of Fourier Analysis to the Description and Statistical Analysis of Refractive Error," Optometry and Vision Science 74 (6), pp. 367-375 (1997).

Goldstein et al, "Moving beyond regression techniques in cardiovascular risk prediction: applying machine earning to address analytic challenges," European Heart Journal, published online on Jul. 19, 2016.

Industrial Norm "Ophthalmic optics—Spectacle lenses—Vocabulary (ISO 13666:2012)," German and English version EN ISO 13666:2012, Oct. 2013.

"Ophthalmic optics—Spectacle frames—Measuring system and terminology" DIN EN ISO 8624:2015-12, Dec. 2015. Relevance is found at least in paragraph [0034] of the specification.

International Search Report issued in PCT/EP2020/061206, to which this application claims priority, dated Jul. 15, 2020, and English-language translation thereof.

Written Opinion issued in PCT/EP2020/061206, to which this application claims priority, dated Jul. 15, 2020.

* cited by examiner

DETERMINATION OF AT LEAST ONE OPTICAL PARAMETER OF A SPECTACLE LENS

CROSS REFERENCE TO RELATED APPLICATIONS

This application is a continuation application of international patent application PCT/EP2020/061206, filed Apr. 22, 2020, designating the U.S. and claiming priority from European patent application EP 19170551.6, filed Apr. 23, 2019, and the entire content of both applications is incorporated herein by reference.

TECHNICAL FIELD

The present disclosure relates to a method, an apparatus, and a computer program for determining at least one optical parameter of a spectacle lens, and also a method for producing a spectacle lens using the at least one optical parameter.

BACKGROUND

Methods for determining optical parameters of spectacle lenses are known from the related art.

The standard DIN EN ISO 13666:2013-10, also referred to hereinafter as the "standard," sections 9-12, is concerned with optical parameters of spectacle lenses, in particular with regard to spherical, prismatic and astigmatic properties of the spectacle lenses. In particular, the standard, 9.7.1 and 9.7.2 defines a "back vertex power" as the reciprocal of a paraxial back vertex focal length and a "front vertex power" as the reciprocal of the paraxial front vertex focal length, in each case measured in meters, the "back vertex power" usually also being referred to simply as "vertex power." Hereinafter, therefore, unless expressly mentioned in specific detail, the term "vertex power" denotes the "back vertex power." For further details with regard to the vertex power, reference is made to the standard.

Furthermore, the standard, 11.2, presents a so-called "spherical power," which is defined as a value for the vertex power of a spectacle lens with spherical power or for the respective vertex power in one of two principal meridians of the spectacle lens with astigmatic power. The spectacle lens with astigmatic power in accordance with the standard, 12, combines a paraxial, parallel beam of light in two separate focal lines perpendicular to one another and therefore has a vertex power only in the two principal meridians. In this case, spectacle lenses with astigmatic power may also be referred to as cylindrical spectacle lenses, spherocylindrical spectacle lenses, toric spectacle lenses or spherotoric spectacle lenses. In accordance with the standard, the "astigmatic power" is defined by cylinder power and axis position. In this case, the "cylinder strength" in accordance with the standard, 12.5, represents the absolute value of an "astigmatic difference," which indicates the difference between the vertex powers in the two principal meridians. In accordance with the standard, 12.6, the "axis position" denotes a direction of the principal meridian whose vertex power is used as a reference value. Finally, according to the standard, 12.8, the "strength" of the spectacle lens with astigmatic power is specified by means of three values, comprising the vertex powers of each of the two principal meridians and the cylinder strength. Alternatively, it is possible to specify an arithmetic mean of the three values as a "spherical equivalent," which is defined as spherical distance correction±½ astigmatic correction, the "astigmatic correction" being defined by cylinder strength and axis position.

The vertex powers and the prismatic powers of spectacle lenses are usually determined using a special "vertex power measuring instrument" in accordance with the standard, 8.5. What is disadvantageous about that is that these measuring instruments have to be operated by a specialist, in particular an optician, trained for this purpose, and that these measuring instruments are arranged in a stationary fashion. Such measuring instruments are generally configured moreover to ascertain wearing parameters of the spectacles, which include in particular a corneal vertex distance, a pupil diameter, a pupillary distance and an "as-worn" pantoscopic angle of the spectacle lens. In accordance with the standard, 5.27, the "corneal vertex distance" is defined as the distance between the apex of the cornea (cornea apex) of a user's eye and the back surface of the spectacle lens, measured perpendicular to a plane of the spectacle frame (frame plane). The "pupil" denotes an entrance opening which is present in each of the user's eyes and through which radiation in the form of light can enter the interior of the eye, and for these openings it is possible to determine diameters and distances from photographs of the user. In accordance with the standard, 5.18, the "as-worn pantoscopic angle" or the "pantoscopic angle" is defined as the angle in a vertical plane between a normal with respect to the front surface of a spectacle lens at the center thereof according to the boxed system and a horizontal fixation line of the eye.

DE 10 2011 115 239 A1 discloses ascertaining user data for the production of a spectacle lens with respect to a selected spectacle frame for a user. A method according to the disclosure comprises providing a tracer data set, which defines the shape of the course of the edge of the spectacle lens to be produced; acquiring user image data of at least one partial region of the user's head together with the selected spectacle frame worn by the user; and ascertaining contour points of the edge of the spectacle lens to be manufactured in the user image data on the basis of the tracer data set.

EP 2 608 109 A1 discloses a method for estimating the optical power of correction lenses in spectacles worn by a user, said method comprising the following steps: Capturing two successive images of the user's face, which are arranged in front of a means for capturing these two images, wherein one of these images is captured with spectacles and the other image without spectacles; calibrating one of the two captured images with respect to the other; identifying the position of the iris of each eye in each image; evaluating the magnification or reduction of each imaged iris; and estimating the optical power of the correction lenses on the basis of the evaluated magnification or reduction.

EP 2 830 001 A1 and US 2015/0029323 A1 in each case disclose an image processing apparatus, comprising a determining unit, which determines a property of spectacles on the basis of a first contour position and a second contour position, wherein the first contour position indicates a contour position of a face which appears without the spectacles and is captured from the acquired face image data of a user, and the second contour position indicates a contour position of the face which appears through the spectacles and is captured from the acquired face image data of the user.

WO 2016/181310 A1 discloses apparatuses, methods, and computer programs for determining at least one optical parameter of spectacle lenses. In respect thereof, at least one image of an object which has at least one known dimension and which was recorded through the spectacle lens is subjected to an image processing method in order to ascertain the at least one optical parameter of the spectacle lens.

The optical parameters of the spectacle lenses include, in particular, the spherical power, the cylindrical strength and the axis position of the spectacle lens. By means of the optical parameters thus determined, the wearer of spectacles can instigate the manufacture of a duplicate of his/her spectacle lenses and/or spare lenses.

WO 2017/125 902 A1 discloses one or more tangible, computer-readable, non-transitory storage media with computer-executable instructions which, when they are executed by at least one computer processor, enable the at least one computer processor to process at least one captured image of at least one reflection of a flash of light on a spectacle lens and to determine one or more optical parameters of the lens on the basis of at least one captured image.

WO 2017/134 275 A1 discloses a method for determining an optical axis of a lens with unknown position and/or orientation. The method comprises: a) acquiring at least one direct image of a background comprising identifiable features; b) providing a lens between the background and a camera, such that light rays from the background pass through the lens before they impinge on the camera; c) using the camera to acquire at least one indirect image comprising the background when viewed through the lens; d) identifying at least one identifiable feature in the direct image and a corresponding identifiable feature in the indirect image; and e) using the correspondences from d) to determine an optical axis of the lens without aligning the optical axis of the lens with respect to the camera.

SUMMARY

Proceeding from the disclosure of EP 2 830 001 A1 and US 2015/0029323 A1, in particular, it is an object of the present disclosure to provide a method, an apparatus, and a computer program for determining at least one optical parameter of a spectacle lens, and also a method for producing the spectacle lens using the at least one optical parameter which at least partly overcome the presented disadvantages and limitations of the related art.

In particular, the present method, apparatus, and computer program are intended to make it possible to determine at least one optical parameter of a spectacle lens, typically a vertex power in a spectacle lens with spherical power or the cylindrical strength and the respective vertex power in one of two principal meridians in a spectacle lens with astigmatic power, without the need for special instruments and the determination can therefore be carried out even by laypersons.

This object is achieved by means of a method, an apparatus, and a computer program for determining at least one optical parameter of a spectacle lens, and also a method for producing a spectacle lens using the at least one optical parameter is determined on the basis of the alteration $V_E$ of the visible region of the eye portion of the user or of the face portion of the user adjacent to the at least one eye. Exemplary embodiments, which can be realized individually or in combination, are presented below.

Hereinafter the terms "exhibit," "have," "comprise," or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B," "A has B," "A comprises B," or "A includes B" can refer both to the situation in which no further element aside from B is provided in A, that is to say to a situation in which A consists exclusively of B, and to the situation in which, in addition to B, one or more further elements are provided in A, for example element C, elements C and D, or even further elements.

In a first aspect, the present disclosure relates to a method for determining at least one optical parameter of a spectacle lens. The method comprises the following steps a) and b), typically in the order indicated, it also being possible for the method steps to be carried out partly simultaneously. Furthermore, individual or all steps of the method can be carried out repeatedly. In addition to the stated method steps, the method can also comprise further method steps.

The method for determining at least one optical parameter of a spectacle lens comprises the following steps:

a) Recording at least one image using a spectacle lens; and
b) Determining at least one optical parameter of the spectacle lens by means of image processing of the at least one image,
    wherein the at least one image comprises an eye portion including the eyes and/or a face portion adjacent to the eyes of a user of the spectacle lens.

In accordance with the standard, 8.1.1 and 8.1.2, a "spectacle lens" is understood to mean an optical lens that serves for correcting ametropia of the eye, the optical lens being worn in front of the user's eye, but not in contact with the eye. In the context of the present disclosure, the term "spectacles" denotes any element which comprises two individual spectacle lenses and a spectacle frame, the spectacle lens being provided for insertion into a spectacle frame that is selected by a user of the spectacles. Instead of the term "user" employed here, one of the terms "wearer," "wearer of spectacles" or "subject" can also be used synonymously.

The method for determining at least one optical parameter of a spectacle lens as proposed here is suitable for measuring the optical parameters of a spectacle lens. The value determined in the process can additionally be used for the selection and production of further spectacles, which can serve e.g. as duplicate spectacles or as spare spectacles. In one particular configuration, values obtained by means of the present disclosure for the correction of the spectacle lenses can be used, in particular during virtual viewing of the user who has put on spectacles, this also being referred to as so-called "Virtual Try on," to include the observable reduction or magnification by the spectacle lenses in such a way that a representation of the user with spectacles appears even more realistic.

The at least one optical parameter determined by the present method can be used, in particular, to determine values for a spherocylindrical lens that can be used as a spectacle lens in order to compensate for refractive errors of the eye by means of correction in such a way that as optimal image quality as possible can be achieved for the user. In this case, the term "optical parameter" denotes a value for a property of the spectacle lens which can be set in particular during the production of the spectacle lens from the glass blank or lens blank, typically in order to achieve the intended correction. Various modes of expressions are suitable for describing the spherocylindrical lens. The standard defines for this purpose, in section 11.2, a "spherical power," which is defined as a value for a vertex power of a spectacle lens with spherical power or for the respective vertex power in one of two principal meridians of the spectacle lens with astigmatic power. According to the standard, 9.7.1-9.7.2, the "vertex power" is defined as the reciprocal of a paraxial back vertex focal length, in each case measured in meters. The spherocylindrical spectacle lens with astigmatic power in accordance with the standard, 12, combines a paraxial, parallel beam of light in two separate focal lines perpendicular to one another and therefore has a vertex power only in the two principal meridians. In accordance with the standard, the "astigmatic power" is defined by cylinder power and axis position. In this case, the "cylinder strength" in accordance with the standard, 12.5, represents the absolute value of an "astigmatic difference," which indicates the difference between the vertex powers in the two principal meridians. In accordance with the standard, 12.6, the "axis position" denotes a direction of the principal meridian whose vertex power is used as a reference value. Finally, according to the standard, 12.8, the "strength" of the spectacle lens with astigmatic power is specified by means of three values, comprising the vertex powers of each of the two principal meridians and the cylinder strength.

According to L. N. Thibos, W. Wheeler and D. Horner (1997), *Power Vectors: An Application of Fourier Analysis to the Description and Statistical Analysis of Refractive Error*, Optometry and Vision Science 74 (6), pages 367-375, in order to describe an arbitrary spherocylindrical lens and/or the refractive error, it is suitable in each case to specify a visual acuity vector which can be described by exactly one point in a three-dimensional dioptric space, wherein the three-dimensional dioptric space can be spanned by coordinates which correspond to the visual acuity and the cylindrical strength or are correlated therewith.

Step a) of the present method involves recording at least one image using a spectacle lens. The term "image" relates to a two-dimensional or three-dimensional representation of an object, said representation also being referred to as "imaging" by means of an optical recording unit, referred to hereinafter as "camera." A single image or a plurality of images, in particular a video sequence, can be recorded for this purpose. In this case, the at least one image is recorded by means of the camera in such a way that the spectacle lens is arranged between the camera and the object to be imaged so that a course of a light beam emanating from the camera or impinging on the camera, said course also being referred to as "beam path," is led through the spectacle lens.

According to the disclosure, recording the at least one image in accordance with step a) is effected in such a way that the object represented on the at least one image comprises at least one eye of the user, a face portion of the user adjacent to at least one eye, at least the eyes of the user, a face portion of the user adjacent to the eyes, or both objects, that is to say eye and face portion, wherein the spectacle lens can be arranged between the camera and the object to be imaged by virtue of the user wearing the spectacle lens typically as intended. "Wearing the spectacle lens as intended" by the user means that the user uses the spectacle lens in such a way that the latter can perform its function in accordance with the standard, 8.1.1 and 8.1.2, for correcting ametropia of the user's eye. For this purpose, the user can arrange on his/her face in particular spectacles comprising the spectacle lens in such a way that the spectacle lens can perform the envisaged function.

In one particularly typical configuration of the present disclosure, in addition to the at least one image on which the user wears as intended the spectacles comprising the spectacle lens, at least one further image of the user as comparison image can be recorded on which the user does not wear the spectacles, wherein the remaining parameters used during the recording of the at least one further image are intended as far as possible to be unchanged. The at least one further image of the user without spectacles can thus be used as comparison image, as explained in greater detail below, for the determination—effected in accordance with step b)—of the at least one optical parameter of the spectacle lens in the context of the image processing. In an alternative or additional configuration, a comparison image can be dispensed with, particularly if recourse can be had to already available images of the same object without spectacles or to already available geometric dimensions of the eyes of the user and/or of the face portion of the user adjacent to the eyes, or corresponding data can be at least approximately determined by means of image processing.

In one particularly typical configuration of the present disclosure, the at least one image recorded in accordance with step a) can thus represent at least one eye of the user, wherein the eye of the user, as mentioned, is recorded while the user is wearing the spectacle lens as intended. In an alternative or additional configuration, the at least one image of the face portion of the user adjacent to the eyes can comprise at least one lateral head shape of the user, in particular a region around the relevant temple of the user, which is arranged laterally with respect to the position of the user's eyes. Here, too, this face portion of the user, as already mentioned, is recorded while the spectacle lens is being worn as intended by the user. For this purpose, it is possible to use a single image recorded in accordance with step a) or a plurality of images recorded in accordance with step a), in particular in order to obtain an increased measurement certainty in this way.

As already mentioned moreover, the camera serves as an optical recording unit for recording one or more images of the eye or eyes and/or of a face portion of the user adjacent to the eye or eyes, while the user is wearing spectacles comprising the spectacle lens. In this case, the camera can typically be comprised by a mobile communication device. In this case, the term "mobile communication device" encompasses in particular a cellular phone (cellphone), a smartphone or a tablet. However, other types of mobile communication devices are conceivable. However, other types of cameras are possible. In particular, this can involve at least one rear camera or typically at least one front camera of the mobile communication device. In this way, the desired image of the eye or eyes and/or of the face portion of the user adjacent to the eye or eyes can be recorded by means of the at least one camera advantageously at any arbitrary location.

In one particular configuration, the at least one camera can have a sensitivity in the visible spectral range, i.e. at a wavelength of 380 nm to 780 nm in accordance with ISO standard 20473:2007, in particular in order to be able to carry out recordings in daylight and/or under artificial lighting, for example in an illuminated region of a room. Alternatively or additionally, the at least one camera can have a sensitivity in the infrared spectral range, i.e. at a wavelength of 780 nm to 1 mm, typically of 780 nm to 3 µm, in particular of 780 nm to 1.4 µm (according to the standard, section 4.4, also referred to as "IR-A"). In order to provide infrared radiation, for this purpose provision can be made of a light source which emits in the infrared spectral range, in particular with a wavelength for which the camera has a sufficient sensitivity. The light source can typically be selected from a micro incandescent light or an IR emitter on a solid-state basis.

In accordance with step b), the at least one optical parameter of the spectacle lens is determined by means of image processing of the at least one image that was recorded during step a). From the at least one image recorded by the at least one camera, the desired at least one optical parameter of the spectacle lens can be determined by means of image processing, typically in an evaluation unit configured therefor. As already mentioned, in accordance with the standard, 9.7.1-9.7.2, the term "vertex power" denotes the reciprocal of the paraxial back vertex focal length. A spherocylindrical spectacle lens with astigmatic power has a vertex power in both principal meridians, the astigmatic power being defined by cylinder strength and axis position.

As already mentioned moreover, in one particularly typical configuration, the at least one image recorded in accordance with step a) can represent at least one eye portion of the user comprising an eye of the user, from which the at least one optical parameter of the spectacle lens can be determined by means of image processing with geometric dimensions of the eye being determined. In this case, the term "geometric dimensions of the eye" can encompass any type of dimension with respect to each of the two eyes of the user. This includes in particular dimensions regarding the user's pupil, in particular a position and/or a diameter of the pupil and/or of the iris surrounding the pupil. As already defined above, the "pupil" denotes an entrance opening which is present in each of the user's eyes and through which light can enter the interior of the eye. In the opposite direction, the pupil can be regarded as an exit opening, through which a viewing direction of the user from the eye to the surroundings can be defined.

In one particularly typical configuration of the present disclosure, a common diameter of pupil and iris can be used as a typical geometric dimension of the user's eye. Typically, said diameter can be determined by means of determining a white-to-white distance in the user's eye. In this case, the "white-to-white distance" denotes the common diameter of a transparent region of the respective eye which is protected by the cornea and which comprises the pupil and the iris of the eye, which are surrounded by a so-called "white region" of the eye. For further details, reference is made to the exemplary embodiments below. However, further ways of determining the diameter of pupil and/or iris are possible. In an alternative or additional configuration, a horizontal distance between a right corner and a left corner of the eye and/or a vertical distance between an upper lid and a lower lid of the eye can be specified as a geometric dimension of the user's eye. Further geometric dimensions are conceivable.

In one particularly typical configuration of the present disclosure, for determining absolute values for the geometric dimensions of the user's eye by means of image processing it is possible moreover to include a distance between the relevant eye and the camera. In one configuration, in this case known or estimated values can be used for indicating the distances between the user's eye and the camera. In one typical configuration, the distance between the user's eye and the camera can be detected metrologically. For this purpose, the evaluation unit can furthermore have a device for detecting the distance between the user's eye and the camera. It is thereby possible, by image processing of the image of the user's eye, which image was typically recorded by the camera in accordance with step a), to determine a distance between the camera and the user's eye, this distance also being referred to as "pupil distance." For this purpose it is possible to use known algorithms, in particular pixel matching; artificial intelligence, typically machine learning, particularly typically neural networks, in particular for classification or for regression, i.e. fitting parameters to a predefined function (Fit). In a further configuration, provision can be made of at least two cameras which are arranged jointly in the form of a stereo camera and are therefore configured for detecting the distance between the user's eye and the screen. In this case, the evaluation can be effected by triangulation typically by way of a known number of pixels of the camera during detection of a known object or image content. Alternatively or additionally, the mobile communication device comprising the camera can have a separate distance measuring unit configured for determining the pupil distance between the camera and the user's eye.

In addition to the geometric dimensions of the user's eye which were determined from the at least one image on which the user is wearing as intended the spectacles comprising the spectacle lens, comparison data with respect to the geometric dimensions of the user's eye without spectacles may be available. As already mentioned, for this purpose at least one further image of the user as comparison image can be recorded on which the user is not wearing the spectacles, wherein the remaining parameters of the recording of the image are intended as far as possible to be unchanged. Alternatively or additionally, it is possible to have recourse to already available images or to already known geometric dimensions of the user's eyes or corresponding data can be at least approximately determined by means of the image processing. From a comparison of the geometric dimension of the user's eyes that were recorded while the user is wearing the spectacles comprising the spectacle lens and the comparison data with respect to the geometric dimensions of the user's eye without spectacles, a change in the geometric dimensions of the user's eye can be determined, in particular using the evaluation unit, which change can be used according to the disclosure to deduce a spherical equivalent of the distance correction of the user's eye that is effected by means of the spectacle lens.

What change in the geometric dimensions of the user's eye is observable depends initially on the dioptric power of the spectacle lens used. A spectacle lens with negative dioptric power, which is also referred to as a "negative lens," and which can therefore be used to correct short-sightedness (myopia) of the user, has—in comparison with a dummy lens—an increased thickness at the edge of the lens, while the thickness in the center of the lens is reduced. By contrast, a spectacle lens with positive dioptric power, which is also referred to as a "positive lens" and which can therefore be used to correct long-sightedness (hyperopia) of the user, has—in comparison with the dummy lens—a reduced thickness at the edge of the lens, while the thickness in the center of the lens is increased. In accordance with ISO standard 8624:2011, the terms "dummy lens" or "demo lens" are understood to mean an arbitrary element composed of a slightly curved, optically transparent material without dioptric power, which is configured, in particular for demonstration purposes, to serve as a template for the contour of a spectacle lens. On the basis of the dioptric power and taking account of the sign of its vertex power, when the relevant eye of the user is viewed from the front through the respective spectacle lens, the spectacle lens causes a region of the eye portion of the user that is visible through the spectacle lens to be represented in a varied fashion. In particular, a reduction and a magnification of the region of the eye portion of the user that is visible through the spectacle lens occur in the case of a negative lens and in the case of a positive lens, respectively.

Equation (1) specifies as follows an estimation for an absolute value of an observable alteration $V_E$ of the visible region of the eye portion of the user from a magnitude of a vertex power S' of the spectacle lens:

$$V_E = \frac{1}{1 - \frac{d}{n}D_1} \cdot \frac{1}{1 - ((e + e')S')}, \tag{1}$$

wherein for d=0.0005 m given the presence of a negative lens and d=0.001 m given the presence of a positive lens, a refractive index n=1.5 or 1.52 or 1.6, e=0.012 m and e'=0.013348 m are used. In this case, d is the thickness of a spectacle lens, e is the corneal vertex distance (HSA) and e' is the sum of the HSA and a distance between the corneal vertex and the center of rotation of the eye. $D_1$ is the power of the front lens surface, but for small values can simply be set equal to the vertex power S' in the case of planar spectacle lenses (planolenses). Alternatively or additionally, it is possible here to use a further value for the refractive index, in particular of 1.67 or 1.74 or a combination of values.

The observable alteration $V_E$ of the visible region of the eye portion of the user can thus bring about an alteration of at least one of the geometric dimensions, typically of the white-to-white distance defined above, but also of the distance between the corners of the eye or the eyelids, which can be detected metrologically in a simple manner. In accordance with equation (1), the observable alteration $V_E$ of the visible region of the eye portion of the user is dependent not only on the sign but also on the magnitude of the vertex power S'. From the determination of the observable alteration $V_E$ of the visible region of the eye portion of the user, it is thus possible to deduce the sign and magnitude of the vertex power S' of the respective spectacle lens, and, in the event of a known calibration being present, the sign and the absolute value of the vertex power S' of the respective spectacle lens.

In a further particularly typical configuration, as likewise already mentioned, the image of the face portion of the user adjacent to the eye or eyes can comprise at least the lateral head shape of the user. In this exemplary embodiment, in particular using the evaluation unit, a spherical equivalent of the distance correction of the user's eye can be deduced by taking account of a change in the lateral head shape of the user. Here, too, what observable change in the lateral head shape of the user occurs depends on the dioptric power of the spectacle lens used. In the case of a negative lens, owing to a distortion, the observable change exhibits a concave lateral offset of the lateral head shape which is oriented in the direction of the relevant eye. By contrast, when a positive lens is used, an observable change in the form of a convex lateral offset of the lateral head shape occurs, oriented outwardly away from the relevant eye. For detecting the change in lateral head shape as accurately as possible, it is possible here, too, to use the abovementioned algorithms, in particular pixel matching; artificial intelligence, typically machine learning, particularly typically neural networks, in particular for classification or for regression, i.e. fitting parameters to a predefined function (Fit). However, here, too, the observable change in the lateral head shape depends not only on the sign but also on the magnitude of the vertex power S'. From the determination of the observable change in the lateral head shape, according to the disclosure it is thus likewise possible to deduce the sign and magnitude of the vertex power S' of the respective spectacle lens, and, in the event of a known calibration being present, the sign and the absolute value of the vertex power S' of the respective spectacle lens.

In a particular configuration, in particular for determining the optometric parameters sphere, cylinder and axis, an algorithmic evaluation can be effected using artificial intelligence, in particular machine learning, typically by means of a neural network. In one particularly typical configuration, in the case where data about an influence of the spherocylindrical correction on meridional differences in the magnification and/or reduction are present, the optometric parameters sphere, cylinder and axis can already be deduced from a single image.

In one particular configuration, moreover, in particular for determining the optometric parameters sphere, cylinder and axis for distance correction, a surface shape of the cornea of the eye can be recorded by the camera, wherein typically a first recording without and a second recording with projection of an arbitrary, but known structure, in particular a stripe structure, a chequered structure or a structure comprising crosses or circles, can be effected. On the basis of determining the surface shape of the cornea, it is possible for the astigmatic portion of the correction and of the axis to be determined in a manner known to a person skilled in the art.

In a further aspect of the present disclosure, the at least one image comprising the eye portion including the eyes and/or a face portion adjacent to the eyes of the user of the spectacle lens, which is recorded using a spectacle lens in accordance with step a), and the at least one further image recorded as the at least one comparison image without the use of the spectacle lens can be regarded jointly as a moving pattern with respect to a typically static position of the spectacle lens. Instead of or in addition to the recording of the comparison image, it is possible to have recourse to an already available comparison image. The at least one image and the at least one comparison image can be configured as black and white, monochromatic or multicolored.

Accordingly, in accordance with step b), the at least one optical parameter of the spectacle lens can be determined by means of image processing of the moving pattern defined in this way. In this case, the image processing can typically comprise at least one image analysis algorithm, wherein at least one image statistical parameter is used for image analysis. In this case, the term "image statistical parameter" concerns a static parameter which relates to the at least one image, in particular to at least one selected region, typically to at least one pixel, of the at least one image, in particular of the moving pattern. Typically, the at least one image statistical parameter can be selected from an orientation of at least one selected region in the at least one image, in particular of an edge in the at least one image;

a grayscale value distribution in the at least one image or at least one selected region thereof;

an optical flow of the moving pattern in terms of direction and manifestation;

a local and global change in the moving pattern;

a distribution of spatial frequencies by means of Fourier transformation.

However, other types of image statistical parameters are possible.

Particularly typically, the at least one image statistical parameter can serve for determining the at least one optical parameter of the spectacle lens by means of the at least one image, in particular by means of the moving pattern. In this case, typically a classification or a regression of the at least one image statistical parameter can be carried out. However, other ways of determining the at least one optical parameter of the spectacle lens from the at least one image statistical parameter are conceivable. In this case, the term "classification" denotes an assignment of a value to one of at least two defined value ranges, referred to as "classes." By way of example, the image statistical parameter can be classified with respect to its dioptric power and thus be assigned e.g. to the class "+0.5 diopter" or to the class "+1 diopter." By contrast, the term "regression" denotes a fitting of the at least one image statistical parameter to a predefined function, the fitting also being referred to as "Fit." For this purpose, the fit can comprise e.g. a function which establishes a relationship between the selected image statistical parameter, e.g. an orientation of an edge, and an associated dioptric power. In the case of the present disclosure, in which a value for the at least one optical parameter of the spectacle lens can be selected from a continuous value range, the use of regression is therefore typical.

For determining the at least one optical parameter of the spectacle lens from the at least one image statistical parameter in particular by means of classification or regression, typically a method of artificial intelligence, in particular a machine learning method, can be used. The term "machine learning" refers to a method using artificial intelligence which is used for automatically generating a model for the classification or regression. Here use can typically be made of a machine learning algorithm configured to generate the desired model on the basis of a multiplicity of training data sets. In this case, the machine learning algorithm can be a supervised algorithm or a self-learning algorithm. The machine learning algorithm can utilize and/or comprise a neural network which can typically be developed into a trained neural network by means of the at least one training data set. The neural network can have at least one element selected from hierarchical decision trees, Hough forest, regression forest, Convolutional Neural Network (CNN), Deep Neural Network (DNN) residual neural network, pixel-wise voting, pixel-wise fusion network, deep learning. Alternatively or additionally, use of at least one other method of artificial intelligence, typically a Kernel method, in particular a Support Vector Machine (SVM), is possible.

The present disclosure is explained below—without restriction of the generality—on the basis of the typical example of neural networks; however, the use of some other machine learning algorithm is possible in an analogous manner. Particularly in order to obtain the desired trained neural network, training of the neural network can be effected typically before step b), particularly typically before step a). Typically a multiplicity of training data sets are used for this purpose. In this case, the term "training data set" concerns a data set comprising at least one pair comprising an image, typically a moving pattern composed of the abovementioned image and an associated comparison image, and also at least one assigned optical parameter, wherein the optical parameter can be selected from an optical parameter of the spectacle lens or an optical power related to the spectacle lens, in particular a magnification or distortion caused by the spectacle lens in the image recorded with the spectacle lens. Typically, the at least one optical parameter of the spectacle lens can be selected from a spherical power, a cylindrical power with axis position and/or an addition in the case of progressive lenses. However, other optical parameters of the spectacle lens are possible.

In order to generate a sufficient number of training data sets, a database comprising a multiplicity of such data sets can typically be used for this purpose. In this case, the data sets used for this purpose can comprise a multiplicity of
  images recorded in accordance with step a),
  of artificially generated images for spectacle lenses with different optical parameters,
  of video sequences that can be created manually by automated robot movements for different spectacle lenses, wherein the at least one spectacle lens or the at least one camera can be moved, or
  of processing images created by data augmentation. Alternatively or additionally, the database can comprise further data sets suitable as training data sets for the selected neural network. In this case, from the training data sets, typically firstly the at least one image statistical parameter can be determined and then the at least one optical parameter of the spectacle lens can be determined therefrom. A direct, time-saving and targeted assignment of the at least one optical parameter of the spectacle lens to the moving pattern can thus be effected.

Typically, the at least one image and the at least one comparison image can be recorded by means of at least one camera, preference being given to at least one camera comprised by a mobile communication device, in particular a smartphone or a tablet. However, other types of cameras are conceivable. Likewise, it is possible to effect the determination of the at least one optical parameter of the spectacle lens from the at least one image statistical parameter, in particular by means of classification or regression, typically by means of a trained neural network which is stored on the mobile communication device and can be implemented there, while the previous training of the neural network can typically be carried out on a stationary computer. However, other types of configuration are conceivable.

If the spectacle lens is shaped as a cylindrical lens as usual, it is possible to consider manifestations of the at least one image statistical parameter typically separately in two different spatial axis directions. Furthermore, given the occurrence of a refractive power profile or a magnification profile on the spectacle lens, as is usual particularly in the case of a progressive lens, an alteration of the at least one image statistical parameter along the refractive power profile may be different. In order to be able to evaluate such patterns, it is possible to create a multiplicity of different training data sets for correspondingly trained neural networks in order thus to classify different types of spectacle lenses with regard to different image statistical parameters.

In order to be able to carry out a determination of the at least one spatial axis, an ascertainment of the relative orientation of the spectacle lens can furthermore necessarily be ascertained. Various methods that enable frame detection can be used for this purpose. In particular, a discontinuity of the optical parameter, e.g. of the refractive power or the magnification, can occur at the spatial transition at the edge of the spectacle lens, wherein a relative position of the spectacle lens can be determined if the discontinuity is detected. However, other types of frame detection are possible.

In this particularly typical configuration of the present disclosure, therefore, there is no need for analytical descriptions between a change in the moving pattern assumed between the at least one image and the at least one comparison image and the at least one optical parameter of the spectacle lens. In this case, rather, such a nonlinear, high-dimensional function can be generated and used by employing the training data sets used to train the selected neural network for determining the at least one optical parameter of the spectacle lens from the at least one image statistical parameter, in particular by means of classification or regression.

In a further aspect, the present disclosure relates to a computer program for determining at least one optical parameter of a spectacle lens, wherein the computer program is configured to carry out the determination of the at least one optical parameter of the spectacle lens in accordance with the method for determining at least one optical parameter of a spectacle lens as described herein.

In a further aspect, the present disclosure relates to a method for producing a spectacle lens, wherein the spectacle lens is produced by processing a lens blank (standard, section 8.4.1) or a spectacle lens semifinished product (standard, section 8.4.2), wherein the lens blank or the spectacle lens semifinished product is processed in each case on the basis of refraction data and optionally centration data, wherein the refraction data are defined in accordance with the method for determining at least one optical parameter of a spectacle lens as described herein. The refraction data typically comprise the correction of the refractive error of the at least one eye of the user with respect to the spherical correction and the astigmatic correction with axis position, in each case for distance vision and/or for near vision. The centration data typically comprise at least the face form angle, the angle between the frame plane and the right or left lens plane, pursuant to the standard, section 17.3, and/or the coordinates of the centration point, i.e., the absolute value of the distance of the centration point from the nasal vertical side or from the lower horizontal side of the boxed system, measured in the lens plane, pursuant to the standard, section 17.4, and/or the corneal vertex distance, i.e., the distance between the back surface of the spectacle lens and the apex of the cornea measured in the viewing direction perpendicular to the frame plane, pursuant to the standard, section 5.27, and/or the "as-worn" pantoscopic angle or pantoscopic angle, i.e., the angle in the vertical plane between the normal with respect to the front surface of a spectacle lens at the center thereof according to the boxed system and the fixation line of the eye in the primary position, which is usually assumed as horizontal, pursuant to the standard, section 5.18, and/or optionally the far visual point, i.e., the assumed position of the visual point on a spectacle lens for distance vision under given conditions, pursuant to the standard, section 5.16, and/or optionally the near visual point, i.e., the assumed position of the visual point on a spectacle lens for near vision under given conditions, pursuant to the standard, section 5.17.

In a further aspect, the present disclosure relates to an apparatus for determining at least one optical parameter of a spectacle lens. According to the disclosure, the apparatus comprises at least one camera configured for recording at least one image using a spectacle lens; and an evaluation unit configured for determining at least one optical parameter of the spectacle lens by means of image processing of the image, wherein the at least one camera is configured to carry out the recording of the at least one image in such a way that the at least one image comprises an eye portion including the eyes and/or a face portion adjacent to the eyes of a user of the spectacle lens.

In one particularly typical configuration, the evaluation unit can furthermore have a device for detecting a distance between the user's eye and the screen or the camera. For this purpose, by means of image processing, an image which was recorded by the camera in particular from the eye portion of the user, from a determination of a pupil distance between the camera and the user's eye, can to carry out a determination of the diameter of pupil and/or iris. In one typical configuration, provision can be made of at least two cameras which are arranged jointly in the form of a stereo camera and are therefore configured for detecting the distance between the user's eye and the screen. Alternatively or additionally, the apparatus can comprise a distance measuring unit configured for determining the pupil distance between the camera and the user's eye.

For definitions and optional configurations of the computer program and of the apparatus for determining at least one optical parameter of a spectacle lens and also of the method for producing a spectacle lens, reference is made to the description above or below of the method for determining at least one optical parameter of a spectacle lens.

The apparatus according to the disclosure and the present methods have numerous advantages over conventional apparatuses and methods.

In summary, in the context of the present disclosure, the following exemplary embodiments are particularly typical:

Exemplary embodiment 1. A method for determining at least one optical parameter of a spectacle lens, wherein the method comprises the following steps:
a) Recording at least one image using a spectacle lens; and
b) Determining at least one optical parameter of the spectacle lens by means of image processing of the at least one image,
wherein the at least one image comprises an eye portion including at least one eye or an eye portion including the eyes and/or a face portion adjacent to at least one eye or a face portion adjacent to the eyes of a user of the spectacle lens.

Exemplary embodiment 2. The method according to the preceding exemplary embodiment, wherein a vertex power is determined as the optical parameter.

Exemplary embodiment 3. The method according to the preceding exemplary embodiment, wherein the vertex power is selected from: the vertex power of the spectacle lens with spherical power or the respective vertex power in one of two principal meridians of the spectacle lens with astigmatic power.

Exemplary embodiment 4. The method according to any of the preceding exemplary embodiments, wherein an alteration of a region of the eye portion of the user that is visible through the spectacle lens is effected by the recording of the at least one image using the spectacle lens.

Exemplary embodiment 5. The method according to the preceding exemplary embodiment, wherein the alteration concerns at least one geometric dimension of the eye.

Exemplary embodiment 6. The method according to the preceding exemplary embodiment, wherein the geometric dimension of the eye is selected from: a white-to-white distance in the eye, a horizontal distance between a right corner and a left corner of the eye and a vertical distance between an upper eyelid and a lower eyelid of the eye.

Exemplary embodiment 7. The method according to any of the preceding exemplary embodiments, wherein the alteration $V_E$ of the visible region of the eye portion of the user or of the face portion of the user adjacent to the eyes is determined in accordance with equation $$V_E = \frac{1}{1 - \frac{d}{n}D_1} \cdot \frac{1}{1 - ((e+e')S')}, \quad (1)$$

wherein for d=0.0005 m in the case of a negative lens and d=0.001 m in the case of a positive lens,
n=1.5 or 1.52 or 1.6 or 1.67 or 1.74 or a combination thereof, e=0.012 m and e'=0.013348
m are used, and wherein S' corresponds to the vertex power of the spectacle lens.

Exemplary embodiment 8. The method according to any of the preceding exemplary embodiments, wherein the face portion adjacent to the at least one eye or to the eyes comprises a lateral head shape of the user.

Exemplary embodiment 9. The method according to the preceding exemplary embodiment, wherein the lateral head shape comprises a region around the relevant temple of the user.

Exemplary embodiment 10. The method according to either of the two preceding exemplary embodiments, wherein an alteration of a shape of the lateral head shape of the user is effected by the recording of the at least one image using the spectacle lens.

Exemplary embodiment 11. The method according to the preceding exemplary embodiment, wherein a spectacle lens with negative dioptric power (negative lens) is used.

Exemplary embodiment 12. The method according to the preceding exemplary embodiment, wherein the alteration brings about a concave lateral offset of the lateral head shape of the user.

Exemplary embodiment 13. The method according to any of the three preceding exemplary embodiments, wherein a spectacle lens with positive dioptric power (positive lens) is used.

Exemplary embodiment 14. The method according to the preceding exemplary embodiment, wherein the alteration in shape brings about a convex lateral offset of the lateral head shape of the user.

Exemplary embodiment 15. The method according to any of the preceding exemplary embodiments, wherein the method is carried out while the user is wearing spectacles.

Exemplary embodiment 16. The method according to any of the preceding exemplary embodiments, wherein additionally at least one further image without the use of the spectacle lens is recorded as comparison image.

Exemplary embodiment 17. The method according to any of the preceding exemplary embodiments, wherein the at least one comparison image is recorded for determining the alteration.

Exemplary embodiment 18. The method according to the preceding exemplary embodiment, wherein the at least one comparison image is recorded while the user is not wearing spectacles or is wearing spectacles comprising a dummy lens instead of the spectacle lens.

Exemplary embodiment 19. The method according to any of the preceding exemplary embodiments, wherein for determining the alteration, recourse is had to an already available comparison image.

Exemplary embodiment 20. The method according to any of the preceding exemplary embodiments, wherein for determining the alteration, recourse is made to already available geometric dimensions of at least one eye or of the eyes of the user and/or of the face portion of the user adjacent to at least one eye or to the eyes.

Exemplary embodiment 21. The method according to any of the preceding exemplary embodiments, wherein a distance between the user's eye and at least one camera configured for recording the at least one image is additionally detected.

Exemplary embodiment 22. The method according to the preceding exemplary embodiment, wherein the distance between the user's eye and the camera is a pupil distance.

Exemplary embodiment 23. The method according to either of the two preceding exemplary embodiments, wherein the distance is detected by means of a distance measuring unit.

Exemplary embodiment 24. The method according to any of the three preceding exemplary embodiments, wherein the distance is detected by means of the camera.

Exemplary embodiment 25. The method according to any of the four preceding exemplary embodiments, wherein the distance is detected by means of at least two cameras configured jointly for detecting the distance.

Exemplary embodiment 26. The method according to the preceding exemplary embodiment, wherein the at least two cameras are arranged jointly in the form of a stereo camera.

Exemplary embodiment 27. The method according to any one of the preceding exemplary embodiments, wherein the cornea of the user's eye is additionally recorded.

Exemplary embodiment 28. The method according to the preceding exemplary embodiment, wherein a first recording without and a second recording with projection of an arbitrary, known stripe structure are effected.

Exemplary embodiment 29. The method according to either of the two preceding exemplary embodiments, wherein a surface shape of the cornea of the user's eye is determined from the recording of the cornea of the user's eye.

Exemplary embodiment 30. The method according to the preceding exemplary embodiment, wherein the surface shape of the cornea of the user's eye is used for determining the optometric parameters sphere, cylinder and axis.

Exemplary embodiment 31. The method according to the preceding exemplary embodiment, wherein an astigmatic portion of a correction and of the axis are determined from the determination of the optometric parameters sphere, cylinder and axis.

Exemplary embodiment 32. The method according to the preceding exemplary embodiment, wherein for determining the optometric parameters sphere, cylinder and axis, an algorithmic evaluation is effected using artificial intelligence, machine learning and/or a network, typically a neural network.

Exemplary embodiment 33. The method according to the preceding exemplary embodiment, wherein the optometric parameters sphere, cylinder and axis are deduced from a single image, particularly if data about an influence of a spherocylindrical correction on meridional differences in the magnification and/or reduction are available.

Exemplary embodiment 34. A computer program for determining at least one optical parameter of a spectacle lens, wherein the computer program is configured to carry out the method steps according to any of the preceding exemplary embodiments.

Exemplary embodiment 35. A method for producing at least one spectacle lens, wherein the spectacle lens is produced by processing a lens blank or spectacle lens semifinished product, wherein the lens blank or the spectacle lens semifinished product is processed on the basis of refraction data and optionally centration data, wherein the refraction data are defined in accordance with the method for determining at least one optical parameter of the spectacle lens as described herein.

Exemplary embodiment 36. An apparatus for determining at least one optical parameter of a spectacle lens, comprising
at least one camera configured for recording at least one image using a spectacle lens; and
an evaluation unit configured for determining at least one optical parameter of the spectacle lens by means of image processing of the at least one image,
wherein the at least one camera is configured to carry out the recording of the at least one image in such a way that the at least one image comprises an eye portion including at least one eye or the eyes and/or a face portion adjacent to at least one eye or the eyes of a user of the spectacle lens.

Exemplary embodiment 37. The apparatus according to the preceding exemplary embodiment, wherein the apparatus is furthermore configured to determine a distance between the apparatus and the user's eye.

Exemplary embodiment 38. The apparatus according to the preceding exemplary embodiment, wherein the evaluation unit is furthermore configured to determine the distance between the apparatus and the user's eye by image processing of the image of the user's eye.

Exemplary embodiment 39. The apparatus according to either of the two preceding exemplary embodiments, wherein the apparatus furthermore comprises a distance measuring unit, wherein the distance measuring unit is furthermore configured to determine the distance between the apparatus and the user's eye.

Exemplary embodiment 40 apparatus according to any of the three preceding exemplary embodiments, wherein provision is made of at least two cameras configured jointly for detecting the distance between the apparatus and the user's eye.

Exemplary embodiment 41. The apparatus according to the preceding exemplary embodiment, wherein the at least two cameras are arranged jointly in the form of a stereo camera.

Exemplary embodiment 42. The apparatus according to any of the five preceding exemplary embodiments, wherein the apparatus is configured as a mobile communication device.

Exemplary embodiment 43. The apparatus according to the preceding exemplary embodiment, wherein the mobile communication device comprises the at least one camera, the evaluation unit and optionally the distance measuring unit.

Exemplary embodiment 44. The apparatus according to either of the two preceding exemplary embodiments, wherein the mobile communication device is configured as a smartphone.

In a further aspect, the method described above and/or the apparatus described above and/or the computer program described above can be employed together with at least one further method and/or at least one further apparatus and/or a further computer program. Said at least one further method can be for example a method for determining a refractive error of a user's eye, typically a method in accordance with EP3730036, wherein said method comprises the following steps:
 a) Representing a character on a screen, wherein a parameter of the character represented on the screen is varied;
 b) Detecting a reaction of the user depending on the character represented on the screen;
 c) Establishing a point in time at which a recognizability of the character represented on the screen for the user is evident from the reaction of the user; and
 d) Determining a value for the refractive error of the user's eye from the parameter defined at the point in time, wherein the character represented on the screen is a periodic pattern, wherein the parameter of the pattern represented on the screen comprises at least one spatial frequency, and the value for the refractive error is determined from the spatial frequency of the pattern defined at the point in time.

As an alternative or in addition to the method described above, the at least one further method can for example also be a method for determining a refractive error of a user's eye, typically a method in accordance with EP3730037, wherein the method comprises the following steps:
 a) Representing a character on a screen, wherein a parameter of the character represented on the screen is varied;
 b) Detecting an eye movement metric of the user's eye depending on the character represented on the screen; and
 c) Establishing a point in time at which a recognition threshold of the user for the character represented on the screen is evident from the eye movement metric of the user's eye; and
 d) Determining a value for the refractive error of the user's eye from the parameter defined at the point in time.

As an alternative or in addition to the methods described above, the at least one further method can for example also be a method for measuring the refractive power distribution of a left and/or a right spectacle lens in a spectacle frame, typically a method in accordance with EP3730919.7, in which, in a first step, at least one image capturing device is used to capture at least one first imaging of a scene from at least one first recording position, wherein said at least one first imaging has at least two structure points and contains a left and/or a right spectacle lens in a spectacle frame with a section of the spectacle frame that defines a coordinate system of the spectacle frame, wherein the at least one imaging beam path for each of these at least two structure points in each case at least once passes and at least once does not pass through the first and/or the second spectacle lens of the spectacle frame. Each imaging beam path comprises the position of the structure point and also the chief ray incident in the at least one image capturing device. A further step, which can temporally precede or succeed the first step, involves capturing at least one further imaging of the scene without the first and/or the second spectacle lens of the spectacle frame or without the spectacle frame containing the first and/or the second spectacle lens with the same at least two structure points of the first imaging of a scene by means of at least one image capturing device from the first recording position or from at least one further recording position different than the first recording position. The at least one image capturing device in the further step can be identical or different to the at least one image capturing device from the first step. Typically, the at least one image capturing device in the further step is identical to the at least one image capturing device from the first step. That is followed by a calculating step which involves determining the coordinates of said at least two structure points in a coordinate system—referenced to the coordinate system of the spectacle frame—of the imaging of said scene from the respective at least one beam path of said at least two structure points which has respectively not passed through the left and/or right spectacle lens, and the at least one further imaging of the scene by means of image evaluation. After this step, the refractive power distribution is determined in a step of determining a refractive power distribution for at least one section of the left spectacle lens in the coordinate system of the spectacle frame and/or in a step of determining a refractive power distribution for at least one section of the right spectacle lens in the coordinate system of the spectacle frame, in each case from the imaging beam paths which have passed through the respective spectacle lens.

As an alternative or in addition to the methods described above, the at least one further method can for example also be a method for measuring the refractive power distribution of a left and/or a right spectacle lens in a spectacle frame, typically a method in accordance with EP3730919, in which, in a first step, at least one image capturing device is used to capture at least one first imaging of a scene from at least one first recording position, wherein said at least one first imaging has at least two structure points and contains a left and/or a right spectacle lens in a spectacle frame with a section of the spectacle frame that defines a coordinate system of the spectacle frame, wherein the at least one imaging beam path for each of these at least two structure points in each case at least once passes and at least once does not pass through the first and/or the second spectacle lens of the spectacle frame. Each imaging beam path comprises the position of the structure point and also the chief ray incident in the at least one image capturing device. A further step, which can temporally precede or succeed the first step or be carried out simultaneously with the first step, involves capturing at least one further imaging of the scene with the left and/or the right spectacle lens in a spectacle frame and with a section of the spectacle frame defining a coordinate system of the spectacle frame by means of at least one image capturing device from at least one further recording position different than the first recording position, with at least one imaging beam path for the same at least two structure points captured in the first imaging, wherein said at least one imaging beam path in each case at least once passes and at least once does not pass through the first and/or the second spectacle lens of the spectacle frame. That is followed by a further step which involves calculating the coordinates of the at least two structure points in a coordinate system— referenced to the coordinate system of the spectacle frame— of the scene from the respective at least one beam path of said at least two structure points which has respectively not passed through the left and/or right spectacle lens, and the at least one further imaging of the scene by means of image evaluation. Afterward, the refractive power distribution is calculated for at least one section of the left spectacle lens in the coordinate system of the spectacle frame and/or the refractive power distribution is determined for at least one section of the right spectacle lens in the coordinate system of the spectacle frame, in each case from the imaging beam paths which have passed through the respective spectacle lens.

Typically, in the two methods above for measuring the refractive power distribution of a left and/or a right spectacle lens, typically in a spectacle frame, a multiplicity of structure points are captured in the respectively first imaging of a scene from in each case at least one first recording position and the respectively succeeding steps are carried out on the basis of this respective multiplicity of structure points. A multiplicity of structure points is understood to mean typically at least 10, more typically at least 100, particularly typically at least 1000 and very particularly typically at least 10000 structure points. In particular, a multiplicity of structure points is ≥100 structure points and ≤1000 structure points.

As an alternative or in addition to the methods described above, the at least one further method can for example also be a method for determining the refractive power distribution of a spectacle lens, typically a method in accordance with EP3730918, which makes possible a local refractive power from the size and/or shape comparison of the imaging of the front eye section for a specific viewing direction. This is done by carrying out at least one recording of the front eye section with and without a spectacle lens situated in front of the latter, and respectively comparing the recording with and without a spectacle lens with one another.

In a superordinate application, the various methods described above, i.e. the method according to the disclosure and also the at least one further method, can be combined in order, from a comparison of the results respectively obtained, for example, to obtain a higher accuracy or a plausibility check of the results obtained in the individual methods. The various methods described above can be effected successively or simultaneously in the superordinate application. If the various methods are effected successively, their order can be independent of one another and/or any desired order can be involved. If the various methods are effected successively, preference may be given to carrying out at least one of the above-described methods for determining the refractive power distribution last. A superordinate application can be for example a computer program comprising the various methods.

BRIEF DESCRIPTION OF THE DRAWINGS

Further details and features of the disclosure will become apparent from the following description of exemplary embodiments. In this case, the respective features can be realized by themselves or as a plurality in combination with one another. The disclosure is not restricted to the exemplary embodiments. The exemplary embodiments are illustrated schematically in the FIGS. In this case, identical reference numerals in the individual FIGS. designate identical or functionally identical elements or elements corresponding to one another with regard to their functions. In detail.

DESCRIPTION OF EXEMPLARY EMBODIMENTS

Figure 1A:
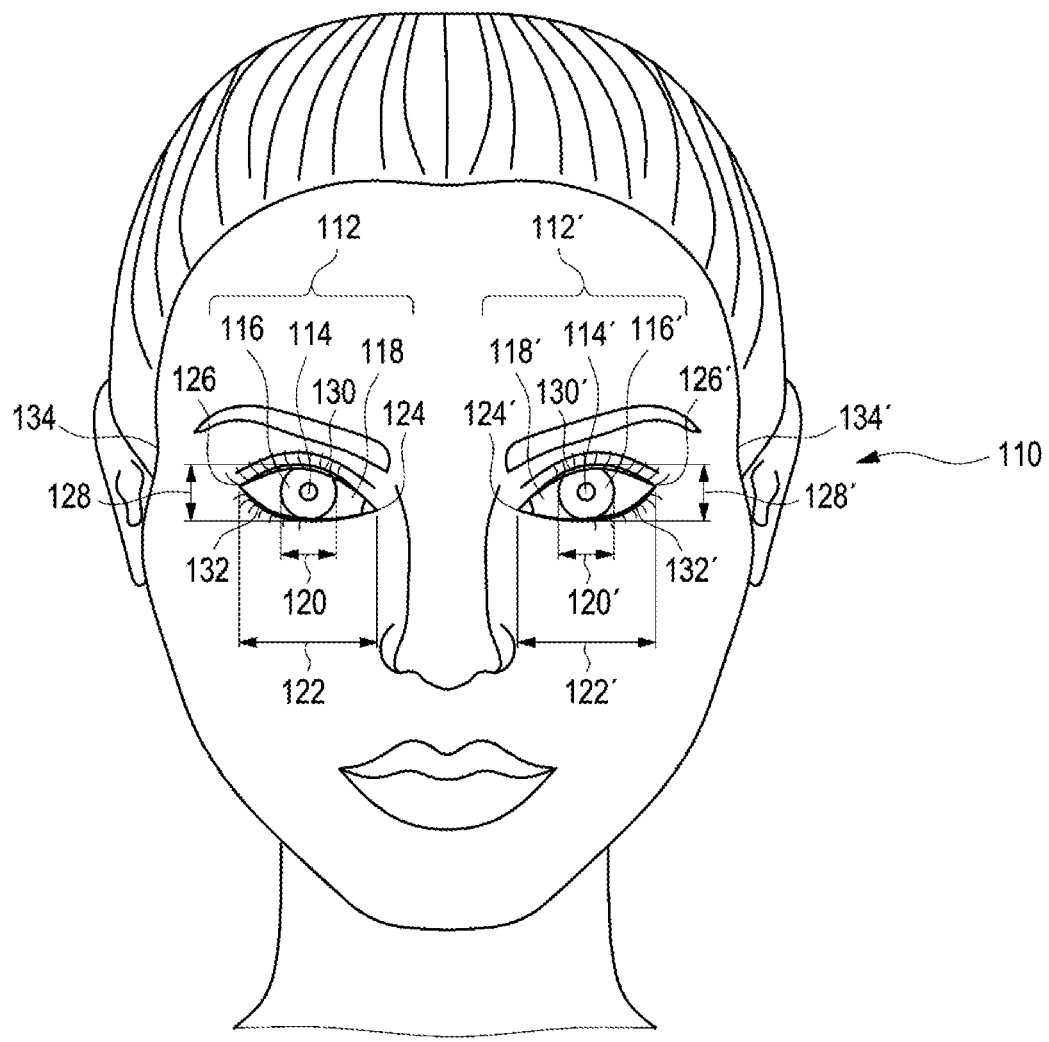
FIG. 1A shows a user not wearing a visual aid.
Figure 1C:
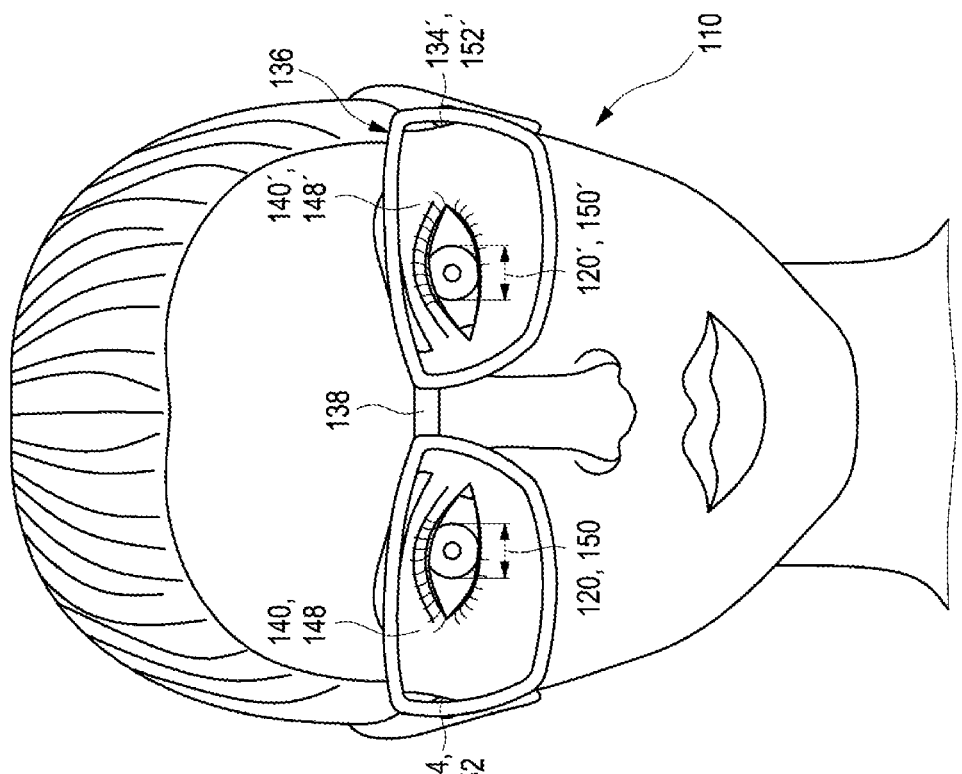
FIG. 1C shows a user wearing spectacles with spectacle lenses having positive dioptric power.
Figure 1B:
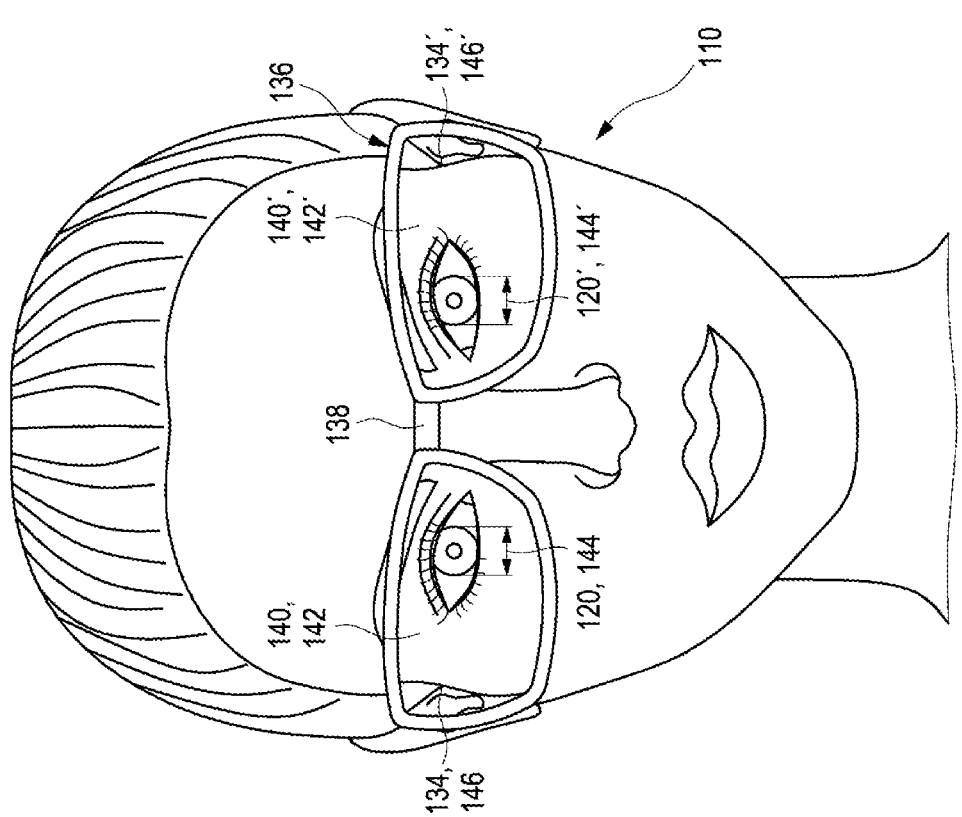
FIG. 1B shows a user wearing spectacles with spectacle lenses having negative dioptric power.

FIGS. 1A to 1C schematically illustrate the functioning of the present disclosure.

To that end, FIG. 1A schematically shows an eye portion 110 of a user, with a right eye 112 and a left eye 112'. In this case, the terms "right" and "left" should be specified from a direction of the user's gaze. Each of the user's eyes 112, 112' comprises a pupil 114, 114', an iris 116, 116' respectively surrounding the pupil 114, 114', and a white region 118, 118' respectively surrounding the iris 116, 116'. In this case, a white-to-white distance 120, 120' can typically be specified as a common diameter of a transparent region of the respective eye 112, 112' which is protected by the cornea and which respectively comprises the pupil 114, 114' and the iris 116, 116'. Alternatively or additionally, a horizontal distance 122, 122' between a right corner 124, 124' and a left corner 126, 126' of each eye 112, 112' or a vertical distance 128, 128' between an upper eyelid 130, 130' and a lower eyelid 132, 132' can be detected metrologically. Furthermore, the eye portion 110 of the user exhibits a respective lateral head shape 134, 134' of the user to the right of the right eye 112 and to the left of the left eye 112'.

The user in the illustration in accordance with FIG. 1A is not wearing any visual aid. Alternatively, the user may wear a visual aid comprising a dummy lens (not illustrated here). By contrast, FIGS. 1B and 1C each show the eye portion 110 of the same user, but here said user is wearing spectacles 136 in each case. The spectacles 136 illustrated in FIGS. 1B and 1C are in each case full-rim spectacles comprising a spectacle frame 138 having two receptacles for a respective spectacle lens 140, 140', which respectively enclose the two spectacle lenses 140, 140'. Within the scope of the present disclosure, however, the user can alternatively also have half-rim spectacles (not illustrated here), in which the two spectacle lenses 140, 140' are only partly adjacent to the spectacle frame 138, or rimless spectacles (likewise not illustrated here), in which the spectacle lenses 140, 140' each have a hole for receiving a mount connecting the spectacle frame 138. Furthermore, the spectacles 136 can comprise further components (not illustrated here), in particular a respective earpiece for supporting the spectacles 136 on each ear of the user and, typically, a respective pad on each side of a user's nose. A totality of the spectacle frame 138, the earpieces and the pads optionally present can jointly also be referred to as a "frame."

A comparison of the eye portions 110 between FIGS. 1A and 1B, on the one hand, and FIGS. 1A and 1C, on the other hand, reveals the following differences on account of the user respectively wearing the spectacles 136 with dioptric power, which differences are used according to the disclosure for determining the at least one optical parameter of each of the two spectacle lenses 140, 140'.

The spectacle lenses 140, 140' of the spectacles 136 worn by the user in FIG. 1B each comprise a spectacle lens with negative dioptric power, which is also referred to as a "negative lens" 142, 142', and which can be used to correct short-sightedness (myopia) of the user on account of said power. In comparison with a dummy lens, each negative lens 142, 142' has an increased thickness at the edge of the lens, while the thickness of each negative lens 142, 142' is reduced in the center of the lens. In the illustration in accordance with FIG. 1B it is assumed that the two negative lenses 142, 142' have the same dioptric power. In principle, however, a difference in dioptric power between the two negative lenses 142, 142' is conceivable and could be used, in a manner analogous to the following description, for the determination according to the disclosure of the at least one optical parameter for each of the negative lenses 142, 142'.

On the basis of the dioptric power and taking account of the sign of their vertex power, when the relevant eye 112, 112' of the user is viewed from the front through the respective negative lens 142, 142', the negative lenses 142, 142' have the effect that a region of the eye portion 110 of the user that is visible through the negative lenses 142, 142' is represented in a reduced fashion. As already explained above, in accordance with equation (1) a magnitude of an observable alteration $V_E$ of the visible region of the eye portion 110 of the user depends here on a magnitude of a vertex power S' of the negative lenses 142, 142':

$$V_E = \frac{1}{1 - \frac{d}{n}D_1} \cdot \frac{1}{1 - ((e + e')S')}, \quad (1)$$

wherein here d=0.0005 m, the refractive index n=1.5 or 1.52 or 1.6 or 1.67 or 1.74 or a combination thereof, e=0.012 m and e'=0.013348 m. To a first approximation, D1 here corresponds to the vertex power S' in the case of planar spectacle lenses (planolenses).

The observable alteration $V_E$ of the visible region of the eye portion 110 of the user can bring about a decrease 144 of the white-to-white distance 120, 120', which can be detected metrologically in a simple manner. By way of example, the white-to-white distance 120, 120' can decrease by approximately 5% from 0.52 mm in the exemplary embodiment in accordance with FIG. 1A to 0.47 mm in the exemplary embodiment in accordance with FIG. 1B. However, other measurement values are possible. For detecting the white-to-white distance 120, 120' as accurately as possible, it is possible to use algorithms, in particular pixel matching, machine learning, neural networks, or fitting parameters to a predefined function (Fits). Alternatively or additionally, the decrease 144 of the horizontal distance 122, 122' from the right corner 124, 124' to the left corner 126, 126' of each eye 112, 112' or of the vertical distance 128, 128' between the upper eyelid 130, 130' and the lower eyelid 132, 132' can also be detected metrologically (not illustrated here) in order in this way to ascertain the observable alteration $V_E$ of the visible region of the eye portion 110 of the user.

In accordance with equation (1), the observable alteration $V_E$ of the visible region of the eye portion 110 of the user in FIG. 1B is dependent not only on the sign but also on the magnitude of the vertex power S'. From the ascertainment of the observable alteration $V_E$ of the visible region of the eye portion 110 of the user, typically from the decrease 144 of the white-to-white distance 120, 120', the sign and magnitude of the vertex power S' of the respective spectacle lens 140, 140' can thus be deduced by means of a known calibration.

In a further typical exemplary embodiment, alternatively or additionally, a spherical equivalent of the distance correction of the user's eye 112, 112' can be deduced by metrologically detecting a change 146 in the lateral head shape 134, 134' of the user. With the use of negative lenses 142, 142' in the exemplary embodiment in accordance with FIG. 1B, the change 146 exhibits a concave lateral offset of the lateral head shape 134, 134' in the direction of the relevant eye 112, 112'. For detecting the change 146 in the lateral head shape 134, 134' as accurately as possible, it is possible here, too, to use known algorithms, in particular pixel matching, machine learning, neural networks, or fitting parameters to a predefined function (Fits). In this case, too, the observable change 146 in the lateral head shape 134, 134' in FIG. 1B is dependent not only on the sign but also on the magnitude of the vertex power S'. From the ascertainment of the observable change 146 in the lateral head shape 134, 134', the sign and magnitude of the vertex power S' of the respective spectacle lens 140, 140' can thus likewise be deduced by means of a known calibration.

In contrast to the exemplary embodiment in accordance with FIG. 1B, the spectacle lenses 140, 140' of the spectacles 136 worn by the user in FIG. 1C each comprise a spectacle lens with positive optical power, which is also referred to as a "positive lens" 148, 148', and which can be used to correct long-sightedness (hyperopia) of the user on account of said power. In comparison with a dummy lens, each positive lens 148, 148' has a reduced thickness at the edge of the lens, while the thickness of each positive lens 148, 148' is increased in the center of the lens. In the illustration in accordance with FIG. 1C, it is likewise assumed that the two positive lenses 148, 148' have the same dioptric power. In principle, however, a difference in dioptric power between the two positive lenses 148, 148' is conceivable and could be used, in a manner analogous to the following description, for the determination according to the disclosure of the at least one optical parameter for each of the positive lenses 148, 148'.

On the basis of the dioptric power and taking account of the sign of their vertex power, when the relevant eye 112, 112' of the user is viewed from the front through the respective positive lens 148, 148', the positive lenses 148, 148' have the effect that a region of the eye portion 110 of the user that is visible through the positive lenses 148, 148' is represented in a magnified fashion. As already explained above, in accordance with equation (1) a magnitude of an observable alteration $V_E$ of the visible region of the eye portion 110 of the user depends here on a magnitude of a vertex power S' of the positive lenses 148, 148':

$$V_E = \frac{1}{1 - \frac{d}{n}D_1} \cdot \frac{1}{1 - ((e + e')S')}, \quad (1)$$

wherein here d=0.001 m, the refractive index n=1.5 or 1.52 or 1.6 or 1.67 or 1.74 or a combination thereof, e=0.012 m and e'=0.013348 m. To a first approximation, D1 here corresponds to the vertex power S' in the case of planar spectacle lenses (planolenses).

The observable alteration $V_E$ of the visible region of the eye portion 110 of the user can bring about an increase 150 of the white-to-white distance 120, 120', which can be detected metrologically in a simple manner. By way of example, the white-to-white distance 120, 120' can increase by approximately 5% from 0.52 mm in the exemplary embodiment in accordance with FIG. 1A to 0.57 mm in the exemplary embodiment in accordance with FIG. 1C. However, other measurement values are possible. Alternatively or additionally, the increase 150 of the horizontal distance 122, 122' from the right corner 124, 124' to the left corner 126, 126' of each eye 112, 112' or of the vertical distance 128, 128' between the upper eyelid 130, 130' and the lower eyelid 132, 132' can also be detected metrologically (not illustrated here).

In accordance with equation (1), the observable alteration $V_E$ of the visible region of the eye portion 110 of the user in FIG. 1B is dependent not only on the sign but also on the magnitude of the vertex power S'. From the ascertainment of the observable alteration $V_E$ of the visible region of the eye portion 110 of the user, typically from the increase 150 of the white-to-white distance 120, 120', the sign and magnitude of the vertex power S' of the respective spectacle lens 140, 140' can thus be deduced by means of calibration.

In a further typical exemplary embodiment, alternatively or additionally, a spherical equivalent of the distance correction of the user's eye 112, 112' can be deduced by metrologically detecting a change 152 in the lateral head shape 134, 134' of the user here as well. With the use of positive lenses 148, 148' in the exemplary embodiment in accordance with FIG. 1C, the change 152 exhibits a convex lateral offset of the lateral head shape 134, 134' outward away from the relevant eye 112, 112'. In this case, too, the observable change 152 in the lateral head shape 134, 134' in FIG. 1C is dependent not only on the sign but also on the magnitude of the vertex power S'. From the ascertainment of the observable change 152 in the lateral head shape 134, 134', the sign and magnitude of the vertex power S' of the respective spectacle lens 140, 140' can thus likewise be deduced by means of calibration here as well.

Figure 2A:
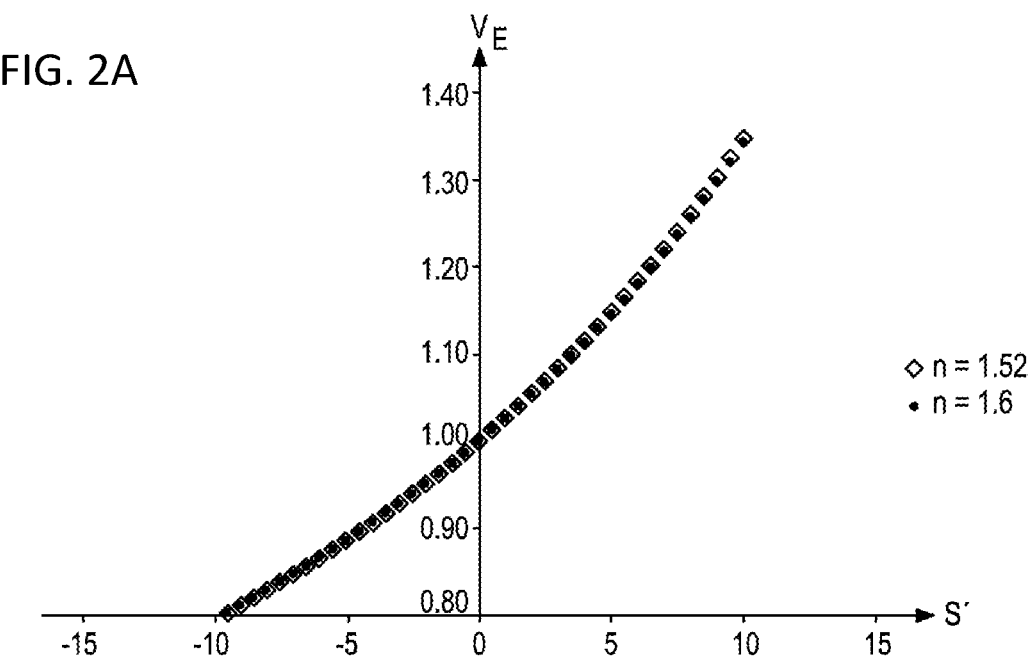
FIG. 2A shows a diagram of the influence of a spectacle lens on an alteration $V_E$ as a function of the refractive index n of the material of the spectacle lens with an identical corneal vertex distance.

FIG. 2A shows a diagram which verifies merely a very small influence on the alteration $V_E$ by the spectacle lens 140, 140'. Here the alteration $V_E$ is illustrated as a function of the refractive index n of the material of the spectacle lens 140, 140' with an identical corneal vertex distance.

Figure 2B:
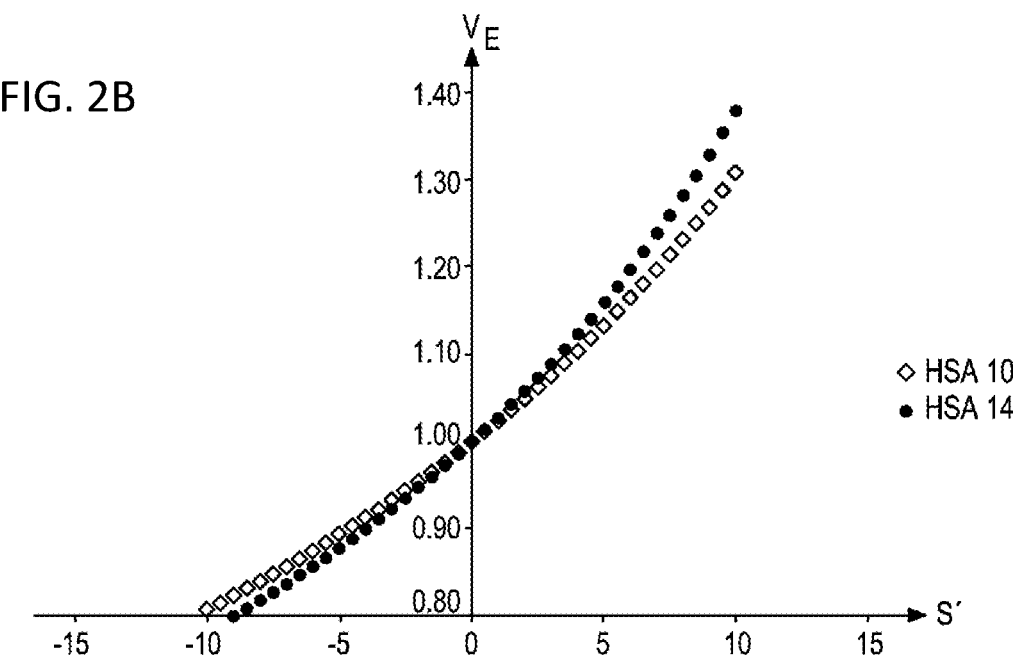
FIG. 2B shows a diagram of the influence of a spectacle lens on an alteration $V_E$ as a function of the corneal vertex distance with an identical refractive index n.

FIG. 2B shows a further diagram, which by contrast verifies a larger influence on the alteration $V_E$ by the spectacle lens 140, 140'. Here the alteration $V_E$ is illustrated as a function of the corneal vertex distance (HSA) with an identical refractive index n of the material of the spectacle lens 140, 140'.

Figure 3:
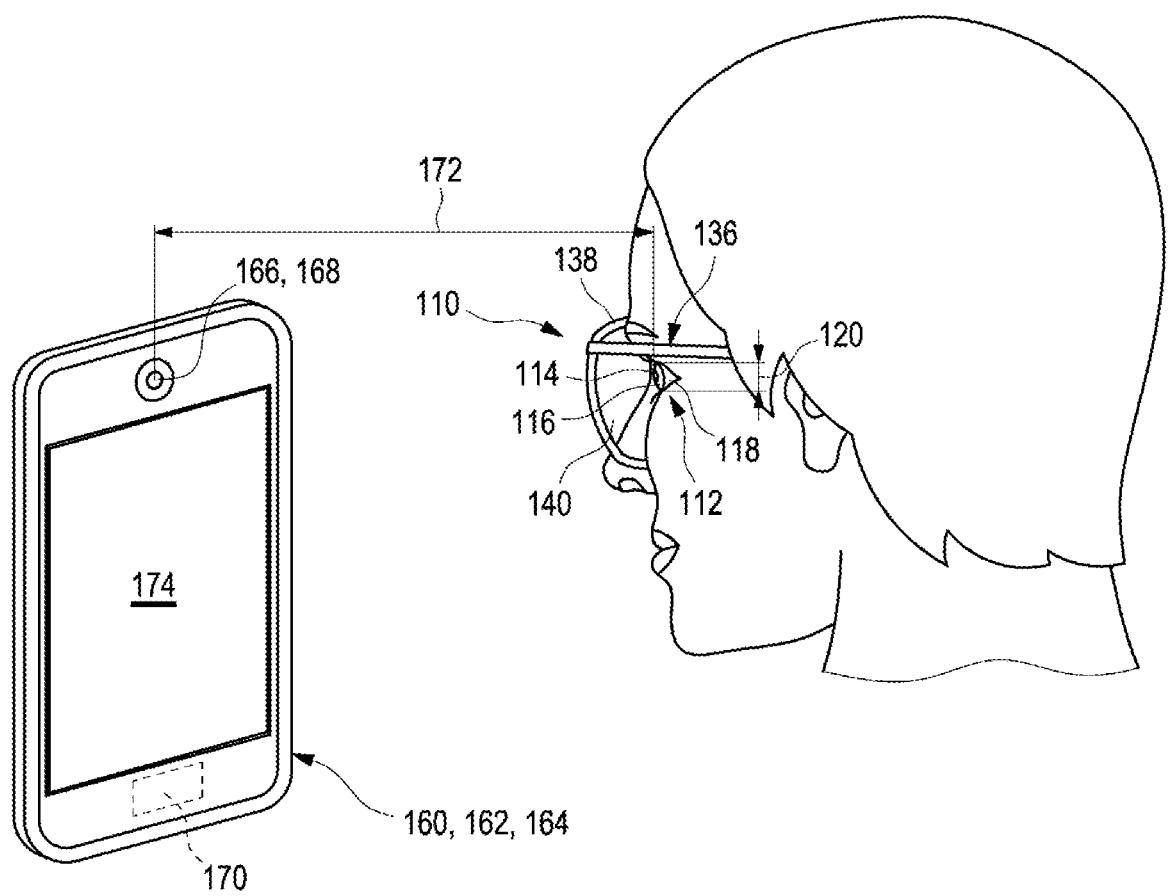
FIG. 3 shows an exemplary embodiment of the method according to the disclosure and of the associated apparatus for determining the at least one optical parameter of the spectacle lens.

FIG. 3 schematically shows one exemplary embodiment of the method according to the disclosure and of the associated apparatus 160 for determining the at least one optical parameter of the spectacle lens 140. In the illustration in accordance with FIG. 3—but without restricting the generality—the apparatus 160 is embodied as a mobile communication device 162 in the form of a smartphone 164. An exemplary embodiment of the apparatus 160 in the form of some other mobile communication device 162, in particular as a cellular phone (cellphone) or tablet, or in the form of some other device is likewise conceivable, however.

The apparatus 160 comprises a camera 166, wherein the camera 166 can typically be a front camera 168 of the smartphone 118. According to the disclosure, the camera 162 is configured for recording an image, wherein the image comprises an eye portion 110 including the eyes 112 and/or a face portion 110 adjacent to the eyes 112 of a user of the spectacle lens 140.

The apparatus 110 furthermore comprises an evaluation unit 170 configured for determining the at least one optical parameter of the spectacle lens 140 by means of image processing of the image. In one particularly typical configuration, the evaluation unit 170 can furthermore comprise a device for detecting a distance between the user's eye 112 and the camera 166. For this purpose, by means of the image processing of the image recorded by the camera 166 in particular from the eye portion 110 of the user, by way of a determination of a distance between the camera 166 and the user's eye 112, which is also referred to as "pupil distance" 172, an absolute value for the white-to-white distance 120 of the user's eye 112 can be ascertained. In an alternative configuration (not illustrated), provision can be made of at least two cameras which are arranged jointly in the form of a stereo camera and are therefore configured for detecting the pupil distance 172. Alternatively or additionally, the apparatus 160 can have a separate distance measuring unit (not illustrated) configured for determining the pupil distance 172. In addition, the apparatus 160 can comprise further component parts, in particular a screen 174 for displaying results and/or requirements to the user.

In accordance with the present method for determining the at least one optical parameter of the spectacle lens 140, step a) involves recording an image comprising an eye portion 110 including the eyes 112 and/or a face portion adjacent to the eyes 112 of a user, wherein the user, as illustrated schematically in FIG. 3, is typically wearing the spectacles 136 comprising the spectacle lens 140. Step b) involves ascertaining at least one optical parameter of the spectacle lens 140 by means of image processing of the image recorded during step a), wherein the procedure explained above in the description concerning FIGS. 1A to 1C is typically used.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

110 Eye portion
112, 112' Eye
114, 114' Pupil
116, 116' Iris
118, 118' White region
120, 120' White-to-white distance
122, 122' Horizontal distance
124, 124' Right corner of the eye
126, 126' Left corner of the eye
128, 128' Vertical distance
130, 130' Upper eyelid
132, 132' Lower eyelid
134, 134' Lateral head shape
136 Spectacles
138 Spectacle frame
140, 140' Spectacle lens
142, 142' Negative lens
144 Decrease
146 (Concave) alteration
148, 148' Positive lens
150 Magnification
152 (Convex) alteration
160 Apparatus for determining the at least one optical parameter of a spectacle lens
162 Mobile communication device
164 Smartphone
166 Camera
168 Front camera
170 Evaluation unit
172 Pupil distance
174 Screen

The invention claimed is:

1. A method for determining at least one optical parameter of a spectacle lens, the optical parameter denoting a value for a property of the spectacle lens which is set during production of the spectacle lens to achieve an intended correction of ametropia of an eye of a user of the spectacle lens, the method comprising:
  recording at least one image of the user wearing the spectacle lens, wherein the at least one image contains at least one of an eye portion including the eye of the user or a face portion adjacent to the eye of the user, wherein an alteration of a region of the at least one of the eye portion or the face portion adjacent to the eye of the user, which region is visible through the spectacle lens, is effected by the recording of the at least one image of the user wearing the spectacle lens; and
  determining the at least one optical parameter of the spectacle lens by image processing of the at least one image,
  wherein the at least one optical parameter of the spectacle lens is determined based on the alteration of the at least one of the eye portion or the face portion adjacent to the eye of the user in accordance with equation (1):

$$V_E = \frac{1}{1 - \frac{d}{n}D_1} \cdot \frac{1}{1 - ((e + e')S')}, \qquad (1)$$

wherein d=0.0005 m in case of a negative lens and d=0.001 m in case of a positive lens, n is a refractive index of a material of the spectacle lens of 1.5 or 1.52 or 1.6 or 1.67 or 1.74 or a combination thereof, and e=0.012 m and e'=0.013348 m, and
wherein S' corresponds to a vertex power of the spectacle lens and $D_1$ corresponds to a power of a front lens surface of the spectacle lens.

2. The method as claimed in claim 1, wherein the at least one optical parameter is the vertex power.

3. The method as claimed in claim 2, wherein the alteration concerns at least one geometric dimension of the eye.

4. The method as claimed in claim 3, wherein the at least one geometric dimension of the eye is selected from a white-to-white distance in the eye, a horizontal distance between a right corner of the eye and a left corner of the eye, and a vertical distance between an upper eyelid and a lower eyelid of the eye.

5. The method as claimed in claim 1, wherein the face portion adjacent to the at least one eye comprises a lateral head shape of the user.

6. The method as claimed in claim 5, wherein the alteration effected by the recording of the at least one image of the user wearing the spectacle lens is an alteration of the lateral head shape of the user.

7. The method as claimed in claim 6, wherein the negative lens brings about a concave lateral offset of the lateral head shape.

8. The method as claimed in claim 6, wherein the positive lens brings about a convex lateral offset of the lateral head shape of the user.

9. The method as claimed in claim 1, further comprising:
  providing at least one further image to determine the alteration, wherein the at least one further image is recorded as a comparison image with the user not wearing the spectacle lens or in that recourse is had to an already available comparison image or to already available geometric dimensions of the at least one of the eye portion or the face portion adjacent to the eye of the user.

10. A computer program for determining at least one optical parameter of a spectacle lens, the optical parameter denoting a value for a property of the spectacle lens which is set during production of the spectacle lens to achieve an intended correction of ametropia of an eye of a user of the spectacle lens, wherein the computer program is stored on a non-transitory computer storage medium and is configured to:
  record at least one image of the user wearing the spectacle lens, wherein the at least one image contains at least one of an eye portion including the eye of the user or a face portion adjacent to the eye of the user, wherein an alteration of a region of the at least one of the eye portion or the face portion adjacent to the eye of the user, which region is visible through the spectacle lens, is effected by the recording of the at least one image of the user wearing the spectacle lens; and determine the at least one optical parameter of the spectacle lens by image processing of the at least one image, wherein the at least one optical parameter of the spectacle lens is determined based on the alteration of the at least one of the eye portion or the face portion adjacent to the eye of the user in accordance with equation (1):

$$V_E = \frac{1}{1 - \frac{d}{n}D_1} \cdot \frac{1}{1 - ((e + e')S')}, \quad (1)$$

wherein d=0.0005 m in case of a negative lens and d=0.001 m in case of a positive lens, n is a refractive index of a material of the spectacle lens of 1.5 or 1.52 or 1.6 or 1.67 or 1.74 or a combination thereof, and e=0.012 m and e'=0.013348 m, and wherein S' corresponds to a vertex power of the spectacle lens and $D_1$ corresponds to a power of a front lens surface of the spectacle lens.

11. A method for producing at least one spectacle lens, wherein the spectacle lens is produced by processing a lens blank or a spectacle lens semifinished product, wherein the lens blank or the spectacle lens semifinished product is processed based on refraction data and optionally centration data, and wherein a definition of the refraction data comprises:

recording at least one image of a user wearing the spectacle lens, wherein the at least one image contains at least one of an eye portion including the eye of the user or a face portion adjacent to the eye of the user, wherein an alteration of a region of the at least one of the eye portion or the face portion adjacent to the eye of the user, which region is visible through the spectacle lens, is effected by the recording of the at least one image of the user wearing the spectacle lens; and determining the at least one optical parameter of the spectacle lens by image processing of the at least one image, wherein the at least one optical parameter of the spectacle lens is determined based on the alteration of the at least one of the eye portion or the face portion adjacent to the eye of the user in accordance with equation (1):

$$V_E = \frac{1}{1 - \frac{d}{n}D_1} \cdot \frac{1}{1 - ((e + e')S')}, \quad (1)$$

wherein d=0.0005 m in case of a negative lens and d=0.001 m in case of a positive lens, n is a refractive index of a material of the spectacle lens of 1.5 or 1.52 or 1.6 or 1.67 or 1.74 or a combination thereof, and e=0.012 m and e'=0.013348 m, and wherein S' corresponds to a vertex power of the spectacle lens and $D_1$ corresponds to a power of a front lens surface of the spectacle lens.

12. An apparatus configured to determine at least one optical parameter of a spectacle lens, wherein the optical parameter denotes a value for a property of the spectacle lens which is set during production of the spectacle lens to achieve an intended correction of ametropia of an eye of a user of the spectacle lens, the apparatus comprising:

at least one camera configured to record at least one image of the user wearing the spectacle lens and to carry out the recording of the at least one image such that the at least one image contains at least one of an eye portion including the eye or a face portion adjacent to the eye of the user, wherein an alteration of a region of the at least one of the eye portion or the face portion adjacent to the eye of the user, which region is visible through the spectacle lens, is effected by the recording of the at least one image using the spectacle lens; and an evaluation unit configured to determine the at least one optical parameter of the spectacle lens by image processing of the at least one image, wherein the at least one camera is further configured to affect that the at least one optical parameter of the spectacle lens is determined based on an alteration of the at least one of the eye portion or the face portion adjacent to the eye of the user in accordance with equation (1):

$$V_E = \frac{1}{1 - \frac{d}{n}D_1} \cdot \frac{1}{1 - ((e + e')S')}, \quad (1)$$

wherein d=0.0005 m in case of a negative lens and d=0.001 m in case of a positive lens, n is a refractive index of a material of the spectacle lens of 1.5 or 1.52 or 1.6 or 1.67 or 1.74 or a combination thereof, and e=0.012 m and e'=0.013348 m, and wherein S' corresponds to a vertex power of the spectacle lens and $D_1$ corresponds to a power of a front lens surface of the spectacle lens.

13. The apparatus as claimed in claim 12, wherein the apparatus is further configured to:

determine a distance between the apparatus and the eye of the user.

14. A method for determining at least one optical parameter of a spectacle lens, wherein the optical parameter denotes a value for a property of the spectacle lens which is set during production of the spectacle lens to achieve an intended correction of ametropia of an eye of a user of the spectacle lens, the method comprising:

recording at least one image of the user wearing the spectacle lens, wherein the at least one image contains at least one of an eye portion including the eye of the user or a face portion adjacent to the eye of the user, wherein an alteration of a region of the at least one of the eye portion or the face portion adjacent to the eye of the user, which region is visible through the spectacle lens, is effected by the recording of the at least one image of the user wearing the spectacle lens;

determining the at least one optical parameter of the spectacle lens by image processing of the at least one image; and providing at least one further image to determine the alteration, wherein the at least one further image is recorded as a comparison image with the user not wearing the spectacle lens or in that recourse is had to an already available comparison image or to already available geometric dimensions of the at least one of the eye portion or the face portion adjacent to the eye of the user, wherein determining the at least one optical parameter of the spectacle lens is effected by image processing of a moving pattern, wherein the moving pattern is composed of the at least one image using a spectacle lens and the at least one comparison image, wherein the image processing includes at least one image analysis algorithm, wherein at least one image statistical parameter is applied in the image analysis, wherein the at least one image statistical parameter is selected from at least one of:
- an orientation of at least one selected region in the at least one image, in particular of an edge in the at least one image;
- a grayscale value distribution in the at least one image or at least one selected region thereof;
- an optical flow of the moving pattern in terms of direction and manifestation;
- a local and global change in the moving pattern; and
- a distribution of spatial frequencies by Fourier transformation, and wherein determining the at least one optical parameter of the spectacle lens is further effected by a classification or a regression of the at least one image statistical parameter with a machine learning method.

15. The method as claimed in claim 14, wherein the machine learning method comprises a neural network.

16. The method as claimed in claim 15, wherein, before the at least one optical parameter is determined, training of the neural network is effected to obtain a trained neural network.

17. The method as claimed in claim 16, wherein a plurality of training data sets is utilized for the training of the neural network, and wherein each training data set has a pair of:
- at least one image and at least one comparison image; and
- at least one assigned optical parameter of the spectacle lens or at least one optical effect related to the spectacle lens.

* * * * *